US012607205B2

(12) United States Patent
Chithravelpillai et al.

(10) Patent No.: US 12,607,205 B2
(45) Date of Patent: Apr. 21, 2026

(54) ENERGY RECOVERY CHARGING OF AN ACCUMULATOR IN A LOW-PRESSURE COMPENSATION CIRCUIT OF AN ELECTRO-HYDROSTATIC ACTUATOR

(71) Applicant: University of Manitoba, Winnipeg (CA)

(72) Inventors: Badhushan Chithravelpillai, Winnipeg (CA); Gustavo Costa, Jaboatao dos Guararapes (BR); Zeljko Tomas, Winnipeg (CA); Nariman Sepehri, Winnipeg (CA)

(73) Assignee: University of Manitoba, Winnipeg (CA)

( * ) Notice: Subject to any disclaimer, the term of this patent is extended or adjusted under 35 U.S.C. 154(b) by 0 days.

(21) Appl. No.: 18/603,412

(22) Filed: Mar. 13, 2024

(65) Prior Publication Data

US 2025/0264116 A1 Aug. 21, 2025

Related U.S. Application Data

(60) Provisional application No. 63/496,516, filed on Apr. 17, 2023.

(51) Int. Cl.

| | |
|---|---|
| ***F15B 1/02*** | (2006.01) |
| ***F15B 1/027*** | (2006.01) |
| ***F15B 1/033*** | (2006.01) |
| ***F15B 11/024*** | (2006.01) |

(Continued)

(52) U.S. Cl.
CPC .............. *F15B 1/024* (2013.01); *F15B 1/027* (2013.01); *F15B 1/033* (2013.01); *E02F 9/2217* (2013.01); *E02F 9/2289* (2013.01); *F15B 2011/0243* (2013.01); *F15B 13/025* (2013.01)

(58) Field of Classification Search
CPC .......... F15B 1/024; F15B 1/027; F15B 1/033; F15B 2011/0243; E02F 9/2217; E02F 9/2289
See application file for complete search history.

(56) References Cited

U.S. PATENT DOCUMENTS

2013/0098012 A1* 4/2013 Opdenbosch ......... E02F 9/2292 60/413
2015/0059325 A1* 3/2015 Knussman .............. F15B 11/17 60/419

(Continued)

FOREIGN PATENT DOCUMENTS

WO WO-2015196041 A2 * 12/2015 ............ E02F 9/2095

*Primary Examiner* — Matthew Wiblin
(74) *Attorney, Agent, or Firm* — Kyle R Satterthwaite; Ryan W Dupuis; Abe & Company Inc

(57) ABSTRACT

An electro-hydrostatic actuator having a main circuit, a charging circuit and four different operating quadrants uses return flow from the main circuit to the charging circuit to charge an accumulator of the charging circuit during an actuator-retracting pumping quadrant and an actuator-retracting motoring quadrant of the actuator's four different operating quadrants. A charged state of the accumulator is used to deliver compensatory flows to the main circuit during at least some instances of an actuator-extending pumping quadrant and an actuator-extending motoring quadrant of the four different operating quadrants.

13 Claims, 7 Drawing Sheets

(51) Int. Cl.
*E02F 9/22* (2006.01)
*F15B 13/02* (2006.01)

(56) References Cited

U.S. PATENT DOCUMENTS

| | | | | |
|---|---|---|---|---|
| 2015/0247513 | A1* | 9/2015 | Morris | E02F 9/2292 701/50 |
| 2018/0230669 | A1* | 8/2018 | Stener | E02F 9/2217 |
| 2022/0002964 | A1* | 1/2022 | Kim | E02F 9/2217 |

* cited by examiner

ENERGY RECOVERY CHARGING OF AN ACCUMULATOR IN A LOW-PRESSURE COMPENSATION CIRCUIT OF AN ELECTRO-HYDROSTATIC ACTUATOR

CROSS-REFERENCE TO RELATED APPLICATIONS

This application claims benefit under 35 U.S.C. 119(e) of U.S. Provisional Application No. 63/496,516, filed Apr. 17, 2023, the entirety of which is incorporated herein by reference.

FIELD OF THE INVENTION

The present invention relates generally to electro-hydrostatic actuators, and more specifically to solutions for capturing and reusing potentially wasted energy during the operation of such actuators.

BACKGROUND

Energetic efficiency is imperative as it directly impacts the fuel consumptions and the environment. One of the areas where efficiency should be considered is in mobile hydraulic machines. In excavators, for example, we usually find a number of single rod hydraulic cylinders and hydraulic motors. Hydraulic cylinders are known for providing high power density [1], high force-to-weight ratios, compactness, and quick responses [2], [3] which makes them desirable when compared to their electric actuator counterparts. In our current energy-demanding world, it is accounted that more than 50% of the energy resources come from coal and oil products (fossil fuels). The resulting greenhouse gas (CO2) emissions have increased by 1.5 times in 2020 when compared to 1990 and has been increasing till now [4]. Due to the associated greenhouse effect, reduction of fossil fuel consumption has been a major concern for manufacturers. For instance, typical excavator valve-controlled actuators require about 23% of the engine output to perform work such as digging and lifting while the remaining energy is dissipated within mechanical and hydraulic components [5]. Most of the energy dissipation occurs due to throttling loses at the control valves. Therefore, improving the energetic efficiency of hydraulic systems will, eventually, decrease emission rates and fuel demands in the long run.

A proven solution that increases efficiency by eliminating throttling loses, is the use of pump-controlled actuator systems where pumps are used to control cylinders instead of valves [6]. In these systems, flow can be controlled by either changing the pump displacement or the prime-mover rotational speed. In this latter case, it is the prime mover that ultimately controls the velocity of the hydraulic cylinder, and the resulting system is termed—"Electro-Hydrostatic Actuator" (EHA). EHAs, therefore, require a prime mover connected to a fixed-displacement, bidirectional pump-motor, whose ports are then connected to a hydraulic cylinder [7]. EHAs have many advantages when compared to valve-controlled actuators, such as easy maintainability, light weight and simple structure, high reliability and little heat loss [8]. However, due to the asymmetric nature of the single-rod cylinder, a challenge is posed when dealing with the uneven flows into and out of the pump. One solution, designed by Costa and Sepehri [9], is characterized by a particular four-quadrant division of the circuit operation, where pumping and motoring quadrants are precisely defined. It is thus understood that during motoring quadrants, the circuit receives mechanical power from the load. However, the pump-motor remains connected to the prime mover (AC servomotor) at motoring quadrants, so that power is still added to the system to control the cylinder speed, by providing a resistive torque at the pump-motor shaft that acts against the hydraulically-generated torque [9]. Therefore, the received mechanical power is simply wasted in the form of heat during motoring quadrants. To improve the EHA efficiency, it is necessary to minimize the potentially wasted energy at motoring quadrants. It is therefore desirable to develop techniques that can capture the otherwise wasted energy during motoring operations.

Several research studies have been conducted to capture and reuse the potentially wasted energy in excavators by employing energy storage components such as hydraulic accumulators, batteries, and supercapacitors. Combining one or more of these components with the actuator systems results in electric hybrids, hydraulic hybrids, or combined electric-hydraulic hybrids. Lin et al. [10] developed a supercapacitor-based electric hybrid system for an excavator to store and reuse boom potential energy. The developed system consisted of an engine, an electric motor, a hydraulic pump, a directional valve, a proportional throttle valve, a controllable electric generator, and a hydraulic motor. During the energy storage process (boom lowering), the hydraulic motor runs the generator, which converts the potential energy into electrical energy, storing it in the supercapacitor. The stored energy can then be reused at the electric motor, adding to the engine power required by the system. Consequently, the power supplied by the engine can be lowered, improving system efficiency by 39%. The low energy density of supercapacitors, large sizes of generators and electric motors, and the presence of the directional valve, place some restrictions on this design. In another design, a battery-based electric hybrid that could increase efficiency up to 54% was proposed by Yoon et al. [11]. The system was actuated by a bidirectional fixed displacement pump-motor driven by an electric motor and a generator. A three-way/three-position directional valve was used along with a proportional pressure relief valve to distribute the uneven flow. During the energy storage process (boom lowering), the bidirectional pump-motor acts as a motor which drives the generator. The potential energy is thus converted into electric energy and is stored in a battery. The stored energy is employed, along with the main power, to lift the boom when necessary. Energy losses during the energy conversion process, low power density of the battery and the large generator and motor sizes limit this design.

A hydraulic hybrid system developed by Hu et al [12] for an excavator arm, consisted of a displacement pump driven by an engine, a four-way directional control valve, a two-position/three-way valve and a two-position/two-way valve. During the energy storage process, the flow returning from the cylinder is directed into the accumulator, storing the gravitational potential energy in the form of hydraulic energy. The stored energy is then used to assist the hydraulic pump during actuation. This system is capable of increasing efficiency by 25.9%. However, the presence of the four-way directional control valve leads to undesirable energy dissipation. Ivantysynova et al. [13] developed a hydraulic hybrid system for an excavator, operating with a 50% downsized engine. The design consists of two accumulators: a low-pressure accumulator and a high-pressure accumulator. The low-pressure accumulator is used for flow-compensation in the circuit. On the other hand, the high-pressure accumulator stores the braking energy of the swing motor, the unused energy from the engine and the potential energy entered through the cylinders. When the engine requires additional power, the high-pressure accumulator drives the variable displacement pump-motor. Energy is also reused by supplying power to the swing motor when necessary. The downside of this design is the high cost.

Hydraulic accumulators can only store a limited amount of energy besides occupying a considerable space in the hydraulic circuit. Based on this fact, studies have been conducted to combine electric and hydraulic hybrids. A combined electric-hydraulic hybrid system proposed by Chen and Zhao [14] is capable of increasing the efficiency from 41.9% to 64.5%. This system uses two fixed displacement pump-motors, a DC motor and two on-off valves. During the energy storage process, valves are activated to direct part of the pressurized flow (potential energy) to the hydraulic accumulator via one of the two pump-motors. If the potential energy of the boom is higher than the storage capacity of the accumulator, the energy excess is branched off through the shafts of the pump-motors, to be stored in a supercapacitor. During the energy reutilization process (boom lifting), part of the cap-side flow is supplemented via the hydraulic accumulator through the second pump-motor. The stored energy in the supercapacitor is also used to drive the pumps. Ge et al. [15] proposed a combined electric-hydraulic system using a novel asymmetric pump with three ports, driven by a servomotor. It has been reported that this design could recover about 82.7% of the total potential energy. Two of the asymmetric pump ports are connected to the cap-side and rod-side of the cylinder, respectively, while the third port is connected to an accumulator. During the energy storage process (boom lowering), the gravitational potential energy is stored as hydraulic energy and electric energy in the accumulator and the supercapacitor, respectively. In the energy recovery process (boom lifting), the stored energy drives the asymmetric pump.

In Applicant's co-pending U.S. Provisional Patent Application 63/490,093, filed Mar. 14, 2023, the entirety of which is incorporated herein by reference, and which is also aimed at improving on the foregoing prior art, Applicant discloses a novel energy storage and reutilization (ESR) system in which an additional bidirectional pump-motor is rotationally linked to that of the EHA, and cooperates with valving of the ESR circuit to charge and discharge an accumulator that stores, and then reutilizes, normally wasted energy from the EHA.

During work on that co-pending invention, the inventors contemplated whether there were other aspects of an EHA where energy recovering could likewise be exploited to further reduce energy consumption, and it was from such exploration that the present invention was derived to capture and reuse normally wasted energy in a low-pressure charging circuit of an EHA. The innovation described herein is usable not only in combination with the ESR system of the Applicant's co-pending application, but also usable within a variety of EHAs, whether as a sole low-level energy recovery means in an otherwise conventional EHA lacking any other energy recovery means, or in combination with one or more additional energy recovery means in the main circuit of the actuator.

SUMMARY OF THE INVENTION

According to a first aspect of the invention, there is provided an electro-hydrostatic actuator comprising:

a main hydraulic circuit having installed therein:

a bidirectional pump-motor rotationally coupled to an electric motor that is operable to drive a pumping operation of said first bidirectional pump-motor;

a hydraulic cylinder; and main circuit valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retracting motoring quadrant; and in connection with the main circuit, a low-pressure charging circuit having installed therein:

an accumulator;

a reservoir tank;

a charge pump; and charge circuit valving co-operable with the accumulator and the charge pump to (i) during the third and fourth quadrants, charge the accumulator using return flow from the main hydraulic circuit; (ii) during the first and second quadrants, in instances thereof characterized by a charged state of the accumulator, deliver compensatory flow to the main hydraulic from the accumulator; and (iii) during the first and second quadrants, in instances thereof characterized by an inadequately charged state of the accumulator, deliver compensatory flow to main hydraulic circuit from the charge pump.

According to a second aspect of the invention, there is provided method of operating an electro-hydrostatic actuator having a main circuit, a charging circuit and four different operating quadrants, said method comprising using return flow from the main circuit to the charging circuit to charge an accumulator of said charging circuit during an actuator-retracting pumping quadrant and an actuator-retracting motoring quadrant of the actuator's four different operating quadrants, and using a charged state of said accumulator to deliver compensatory flows to the main circuit during at least some instances of an actuator-extending pumping quadrant and an actuator-extending motoring quadrant of the four different operating quadrants.

BRIEF DESCRIPTION OF THE DRAWINGS

Preferred embodiments of the invention will now be described in conjunction with the accompanying drawings in which.

DETAILED DESCRIPTION

Figure 1:
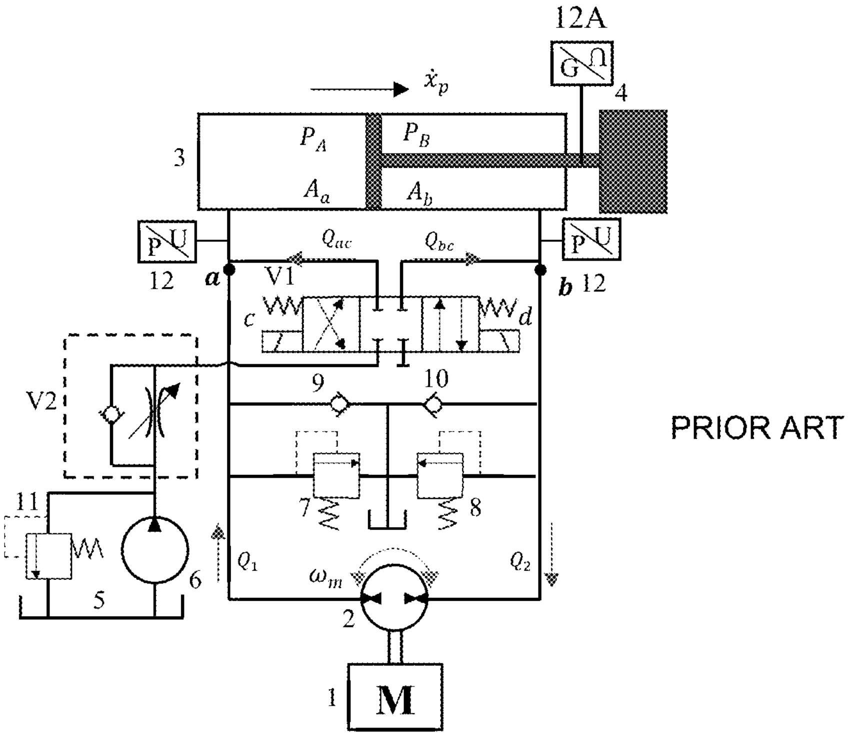
FIG. 1 is a schematic illustration of an electro-hydrostatic actuator (EHA) of the aforementioned type designed by Costa and Sepehri, for the purpose of setting an operational context for the present invention.
Figure 2A:
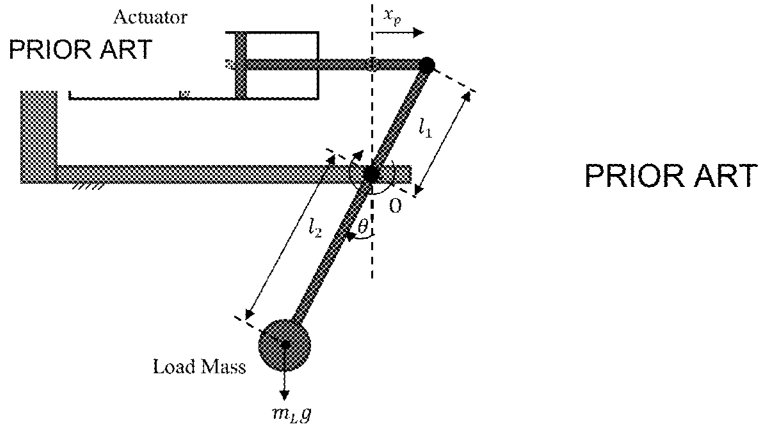
FIG. 2A is a schematic illustration of a backhoe arm that embodies the hydraulic cylinder from the EHA of FIG. 1 for the purpose of driving a connected linkage carrying a load mass, thereby demonstrating one possible operating environment of the present invention.
Figure 2B:
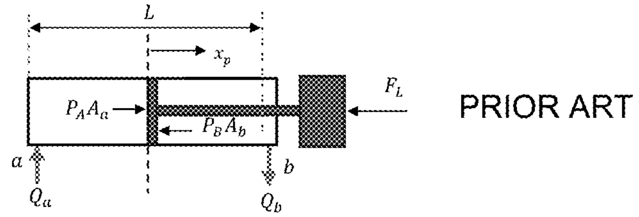
FIG. 2B is a force balance diagram of the hydraulic cylinder from FIG. 1.
Figure 3:
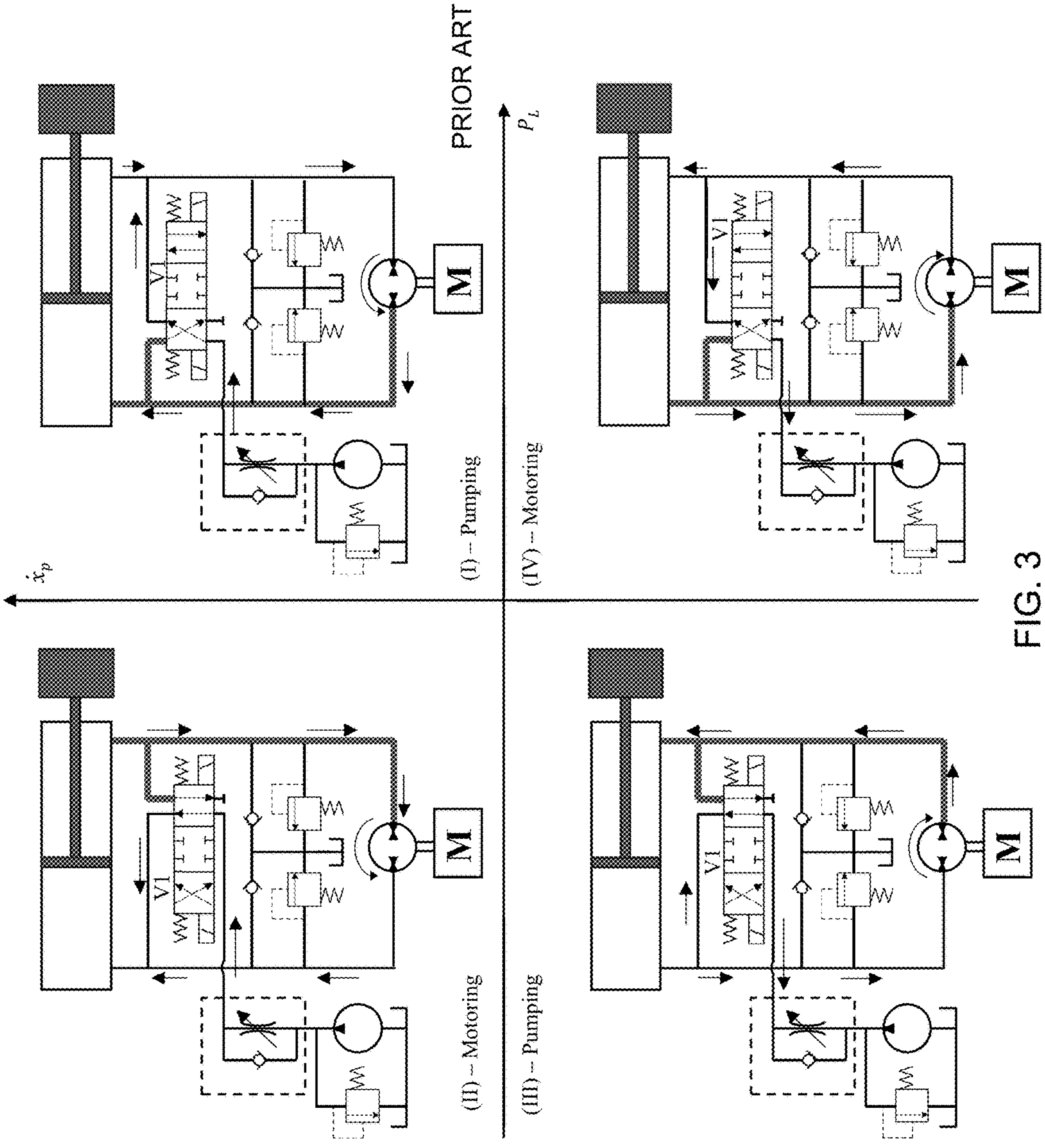
FIG. 3 schematically illustrates four distinct operational quadrants of the EHA of FIG. 1.

Reference is made initially to illustration of relevant prior art in FIGS. 1-3 in order to establish the operating context of the present invention. The schematic of the aforementioned EHA designed by Costa and Sepehri [9] is shown in FIG. 1. The circuit is composed of an AC servomotor 1, that drives a fixed displacement bidirectional pump-motor 2. The pump-motor drives a single-rod hydraulic cylinder 3 to effect displacement of a rod 4 thereof for the purpose of physically manipulating a load mass. A low-pressure compensation circuit of the EHA features a reservoir tank 5, from which the charge pump 6 of this compensation circuit supplies flow to compensate for the differential cylinder effect through valves V2 and V1. Of those valves, V1 is a three-position four-way directional valve, and V2 is a unidirectional flow control valve. A set of relief valves 7, 8 and check valves 9, 10 limit the pressure level within a main circuit of the EHA and prevent cavitation. Another relief valve 11 is also provided in the compensation circuit. Two pressure transducers, 12, are mounted on the hydraulic lines of the main circuit of the EHA, close to the cylinder ports, to measure the cap- and rod-side pressures $P_A$, $P_B$, and a displacement sensor 12A (e.g. incremental encoder), for example mounted on the hinge of a backhoe arm in which the cylinder 3 is embodied in FIG. 2A, is used to measure the displacement of the cylinder rod 4. The cylinder rod velocity, $\dot{x}_p$, is calculated, for example using a 100-point regression algorithm, from the encoder readings. The outlet pressure of the charge pump 6, is set to an appropriate pressure, for example 80 psi, through the relief valve 11 of the compensation circuit.

To define the operation quadrants, a sign convention for the load pressure, $$P_L\left(P_L = P_A - \frac{A_b}{A_a}P_B\right),$$

and cylinder rod velocity, $\dot{x}_p$, is established. The cylinder rod velocity, $\dot{x}_p$, is termed positive during cylinder extension and negative during retraction. Based on the signs of the cylinder rod velocity and load pressure, four quadrants of operation, I, II, III and IV are defined. Quadrant I is defined for $P_L>0$ and $\dot{x}_p>0$. Quadrant III is defined for $P_L<0$ and $\dot{x}_p<0$. These are pumping quadrants, where the energy flows from the circuit to the load. On the other hand, motoring quadrants (II and IV) are those where energy flows from the load to the circuit. Quadrant II is defined for $P_L<0$ and $\dot{x}_p>0$, while quadrant IV is defined for $P_L>0$ and $\dot{x}_p<0$. During quadrants I and III, the pump/motor 2 acts as a pump and consumes energy from the prime mover (motor 1) to extend and retract the cylinder 3. In quadrants II and IV, the load assists the cylinder motion. As a result, energy coming from the load drives the pump/motor 2, now operating as a motor.

The schematic of the arm linkage of the backhoe arm and the force balance on the actuator are shown in FIG. 2. FIG. 3 displays the four-quadrant operation of the EHA. Note that additional flow is supplied to the cylinder during quadrants I and II while the excess flow is sent back to the tank 5 at quadrants III and IV. The connection between the charge pump 6, and the main circuit is carried out by activating the solenoids of the directional valve V1.

Figure 4:
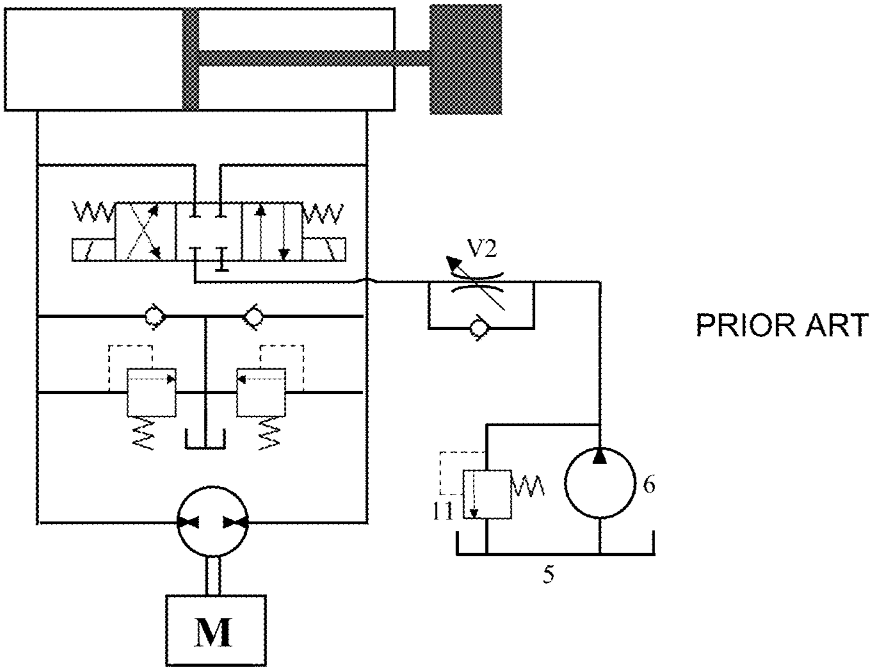
FIG. 4 illustrates modification of a low-pressure charging circuit of the FIG. 1 EHA in a known manner, by adding an accumulator to the charging circuit, whereby the low-pressure pump of the charging circuit charges the accumulator, rather than performing direct pumping of compensatory flow to the main circuit.

FIG. 4 illustrates known supplementation of the charging circuit with a low-pressure accumulator 15 that is charged by charge pump 6, whereby the compensatory flow from the charging circuit to the main circuit of the actuator, through valve V1 thereof, during the actuator-extending first and second operating quadrants is discharged from the accumulator 15 of the charging circuit, rather than directly from the charge pump 6 thereof. The present invention builds on this known incorporation of a low-pressure accumulator 15 into the charging circuit in a manner reducing the amount of charge pump operation needed to operate the charging circuit and derive the needed compensatory flow for the main circuit.

Figure 5:
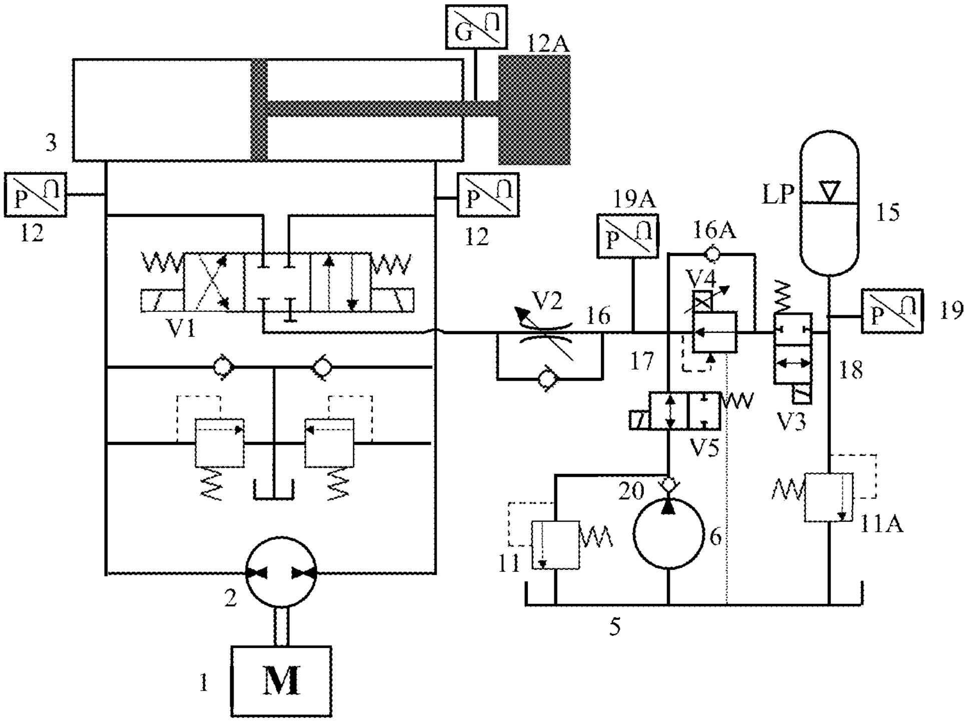
FIG. 5 illustrates further modification of the low-pressure charging circuit of FIG. 4 to derive an improved low-pressure charging circuit that uses recovered energy from the main circuit to charge the accumulator.

FIG. 5 illustrates the inventive modification and supplementation of the accumulator-equipped charging circuit of FIG. 4. The modification and additions to the charging circuit include addition of a normally-closed, solenoid-openable accumulator control valve V3 at an accumulator-adjacent location in the connection line 16 that runs from the accumulator outlet to valve V1 of the main circuit through valve V2; addition of an electro-proportional pressure-reducing valve V4 in the same connection line 16 between valves V2 and V3 in order to act on discharge from the accumulator 15 into the main circuit; rerouting of the output line 17 from the charge pump 6 to feed into the connection line 16 between valves V4 and V2 instead of feeding into the accumulator 15; and installation of a normally-closed, solenoid-openable pump control valve V5 into this output line 17 of the charge pump 6 to selectively allow and prevent flow between the charge pump 6 and the connection line 16. Additionally, a check valve 16 (omitted from subsequent figures to avoid overcrowding) is installed right before the lines that feed into the relief valve 11 and valve V5. This has been added to prevent the reverse operation of charge pump 6. The former location of the pump output line is replaced with an accumulator drain line 18 running from the accumulator 15 to the reservoir tank 5, and this drain line 18 is equipped with its own respective relief valve 11A, like the original relief valve 11 through which the rerouted pump output line 17 is connected to the reservoir tank 5. The novel charging circuit features two additional pressure transducers 19, 19A (shown in FIG. 5, but omitted from subsequent figures to avoid overcrowding), the first of which measures the accumulator pressure $P_{acc}$, and the second of which measures a pressure $P_{PPRV}$ at the electro-proportional pressure-reducing valve (EPPRV) V4.

Figure 6A:
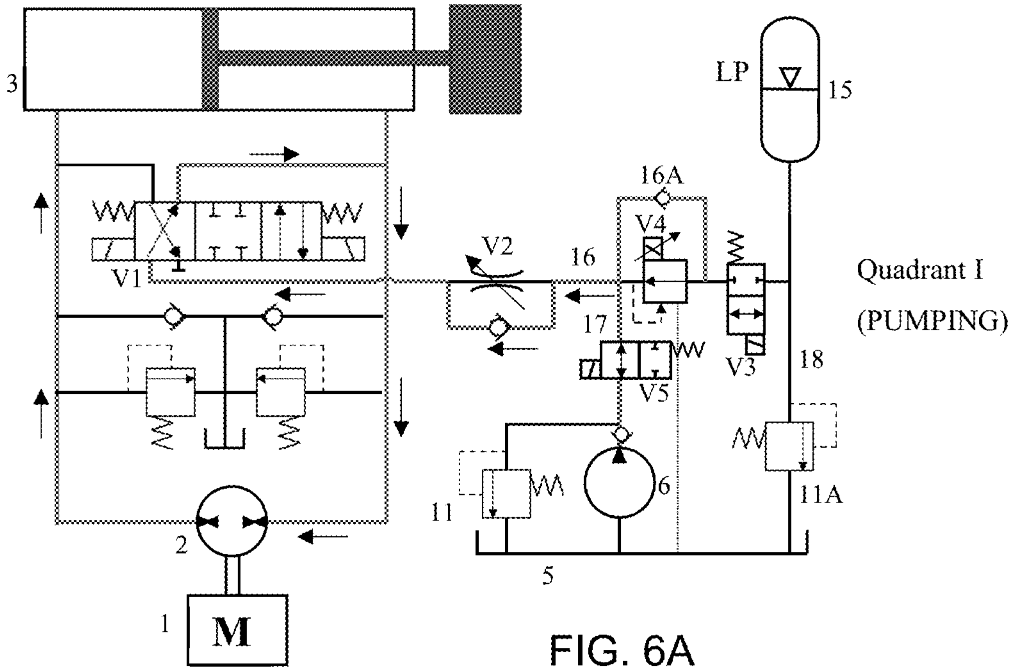
FIGS. 6A and 6B illustrate operation of the low-pressure charging circuit in a conventional fashion during the first and second operating quadrants, respectively, when the accumulator of the charging circuit has not yet been charged.
Figure 6B:
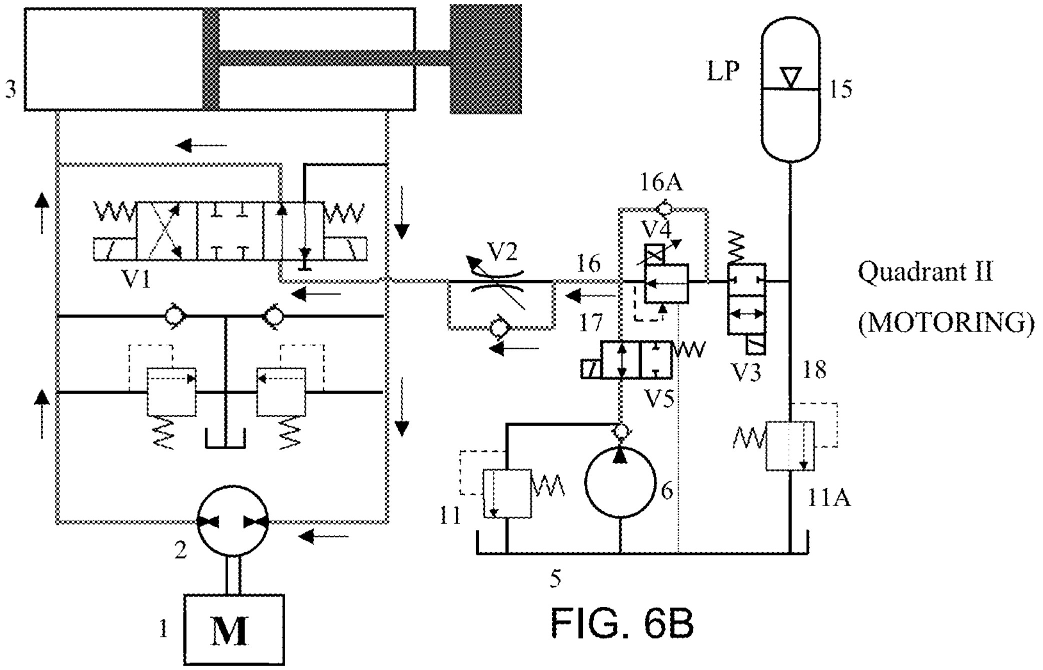

Turning attention to the operation of the novel charging circuit, FIGS. 6A and 6B illustrate operation thereof during actuator-extending pumping Quadrant I and actuator-extending motoring Quadrant II, respectively, of the EHA's operation, particularly in instances thereof in which the accumulator 15 has not yet accumulated a charge therein. In these instances, the novel charging circuit acts in a conventional fashion like the known charging circuit of FIG. 4, where the compensatory flow to valve V1 of the main circuit is provided directly by the charge pump 6. So, in these instances, normally-closed pump control valve V5 is opened, while accumulator control valve V3 is held closed, and the charge pump 6 is activated to pump fluid into the connection line 16, and onward therethrough to valve V1 of the main circuit via valve V2 of the charging circuit. In Quadrant I, the right-shifted position of valve V1 directs the compensatory flow from the charge pump 6 to the return side of the pumping pump/motor 2 in supplement to the rod-side return flow coming from the extending hydraulic cylinder 3. In Quadrant II, the left-shifted position of valve V1 instead directs the compensatory flow from the charge pump 6 to the cap-side of the hydraulic cylinder 3 to supplement the flow thereto from the motoring pump/motor 2.

Figure 7A:
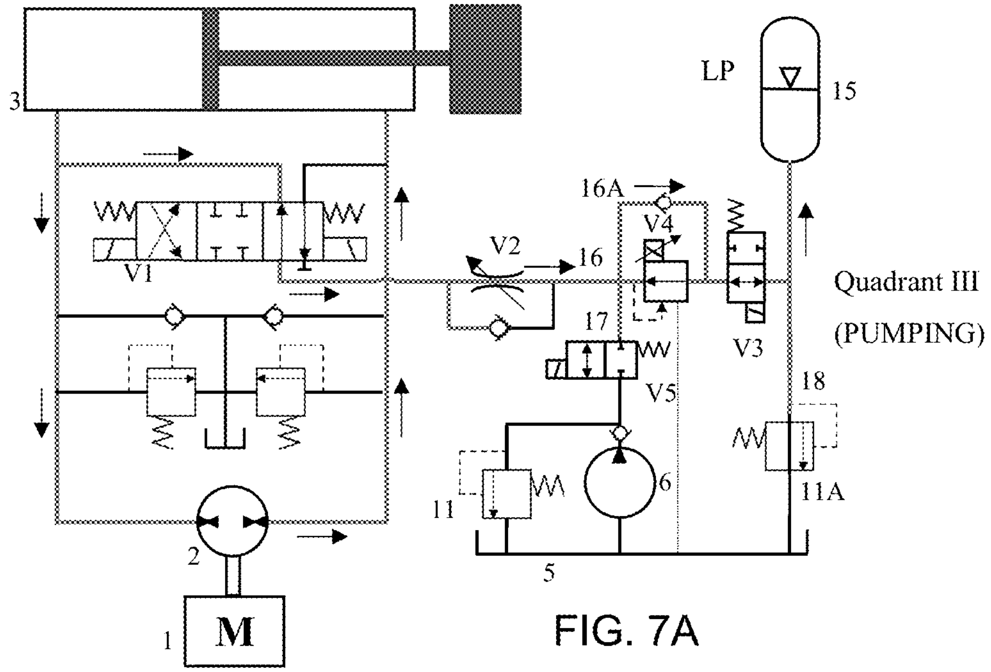
FIGS. 7A and 7B illustrate operation of the low-pressure charging circuit in a novel energy recovery fashion during the third and fourth operating quadrants, respectively, during which return flow from the main circuit charges the accumulator of the charging circuit.
Figure 7B:
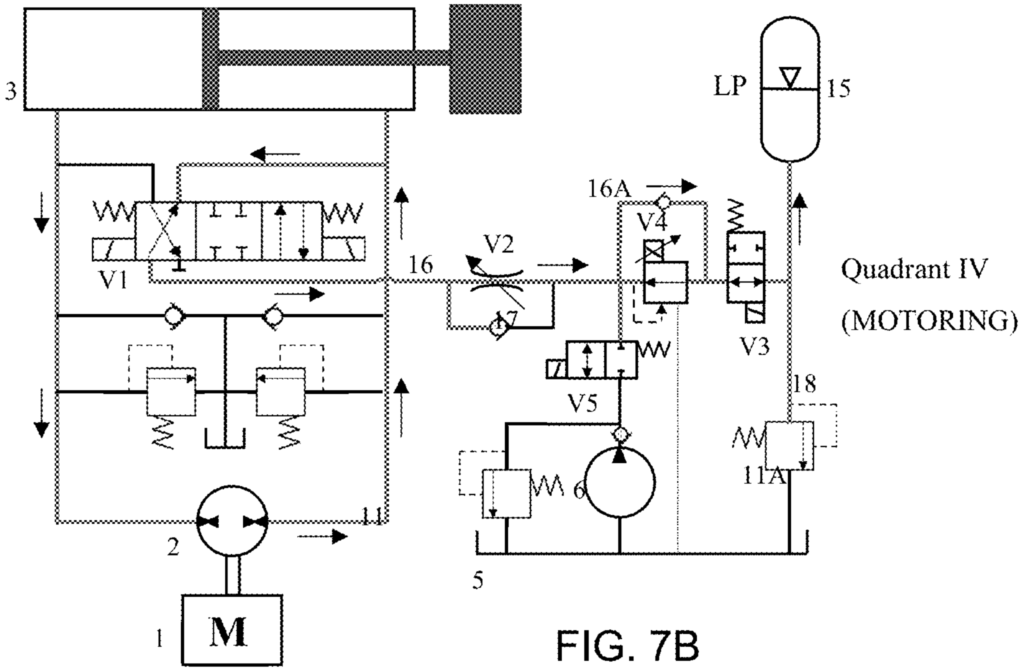

FIGS. 7A and 7B illustrate novel functionality of the novel charging circuit of FIG. 5 during actuator-retracting pumping Quadrant III and actuator-retracting motoring Quadrant IV, respectively, of the EHA's operation, during which the accumulator is charged by return flow to the charging circuit from the main circuit. In Quadrants III and IV, the pump control valve V5 is held closed, thereby disconnecting the charge pump 6 from the connection line 16, and the accumulator control valve V3 is forced open, thereby connecting the accumulator 15 to the connection line 16. In FIG. 7A, part of the return flow from the cap side of the hydraulic cylinder 3 to the pump/motor 2 is routed, via the left-shifted position of valve V1 of the main circuit, into the charging circuit through valve V2, and via a check-valve bypass branch 16A of the connection line, bypasses valve V4 and feeds the accumulator 15 via open valve V3, thereby charging the accumulator. In FIG. 7B, excess flow from the motoring pump/motor 2 to the rod side of the hydraulic cylinder 3 is routed, via to the right-shifted position of valve V1 of the main circuit, into the charging circuit through valve V2, and likewise bypasses valve V4 and charges the accumulator 15 via open valve V3.

Figure 8A:
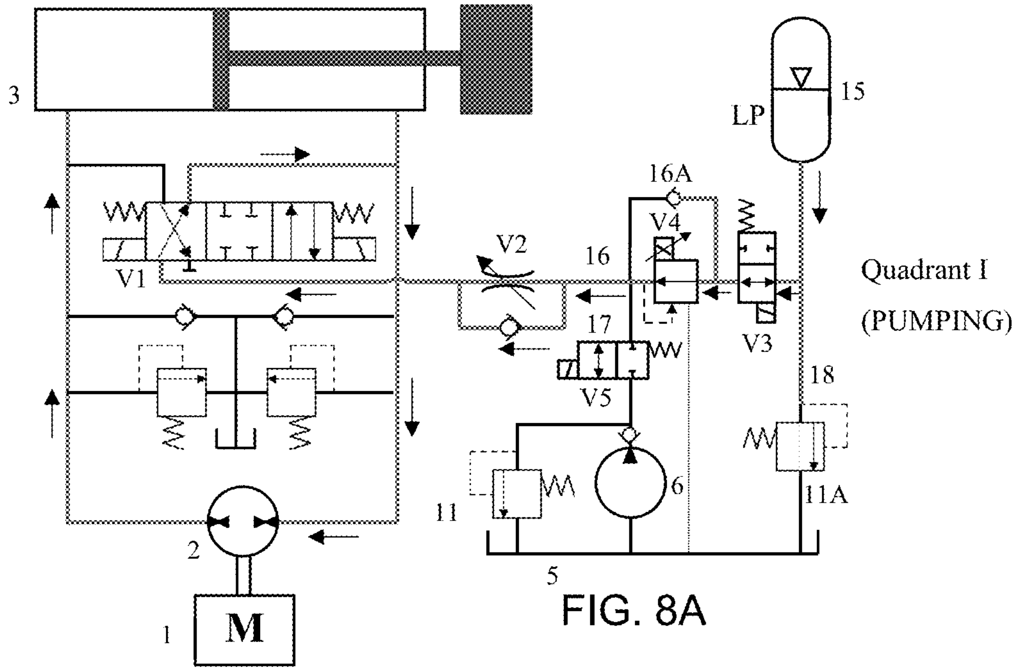
FIGS. 8A and 8B illustrate operation of the low-pressure charging circuit during the first and second operating quadrants, respectively, in instances thereof after the accumulator has been charged in accordance with FIGS. 7A and 7B, whereafter the accumulator discharges compensatory flow to the main circuit during these instances.
Figure 8B:
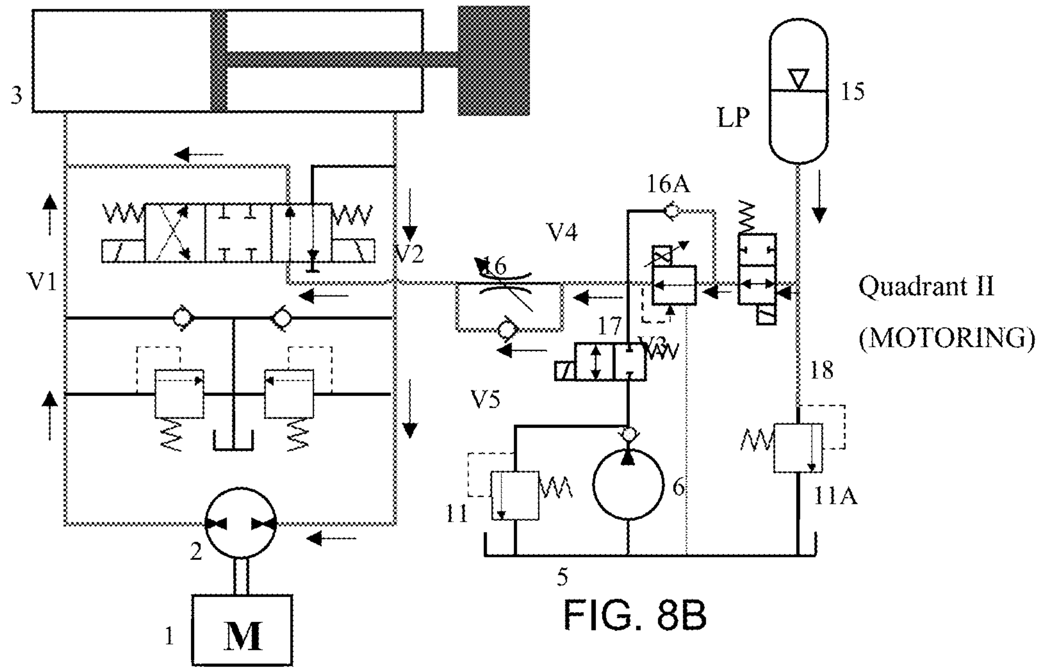

FIGS. 8A and 8B illustrate the functionality of the novel charging circuit of FIG. 5 during instances of the actuator-extending pumping Quadrant I and actuator-extending motoring Quadrant II, respectively, once the accumulator has been charged in the manner shown in FIGS. 7A and 7B. In such accumulator-charged instances of Quadrant I and Quadrant II, the pump control valve V5 is held closed and the accumulator control valve V3 is forced open, just as described for the accumulator-charging Quadrants III and IV of FIGS. 7A and 7B. In FIG. 8A, the charged accumulator discharges through open valve V3 and onward through valves V4 and V2 of connection line 16 into valve V1, whose right-shifted position routes the discharged flow from the accumulator 15 into the return side of the pumping pump/motor 2, thus compensating the return flow from the rod side of the extending hydraulic cylinder 1. In FIG. 8B, the charged accumulator again discharges through open valve V3 and onward through valves V4 and V2 of connection line 16 into valve V1, whose left-shifted position routes the discharged flow from the accumulator 15 to the cap side of the hydraulic cylinder 3, thus compensating the supply flow thereto from the motoring pump/motor 2.

Use of the return flow from the main circuit to the charging circuit during actuator-retracting Quadrants III and IV to charge the accumulator 15 (FIGS. 7A and 7B), instead of simply directing such flow to the reservoir tank 15 via relief valve 11, where the energy of this moving fluid would be dissipated in wasteful fashion, allows the charge pump 6 to be turned off in such instances, thereby reducing the energy consumption of the charging circuit compared to the prior art in which the charge pump 6 is the sole means of charging the accumulator.

Figure 9:
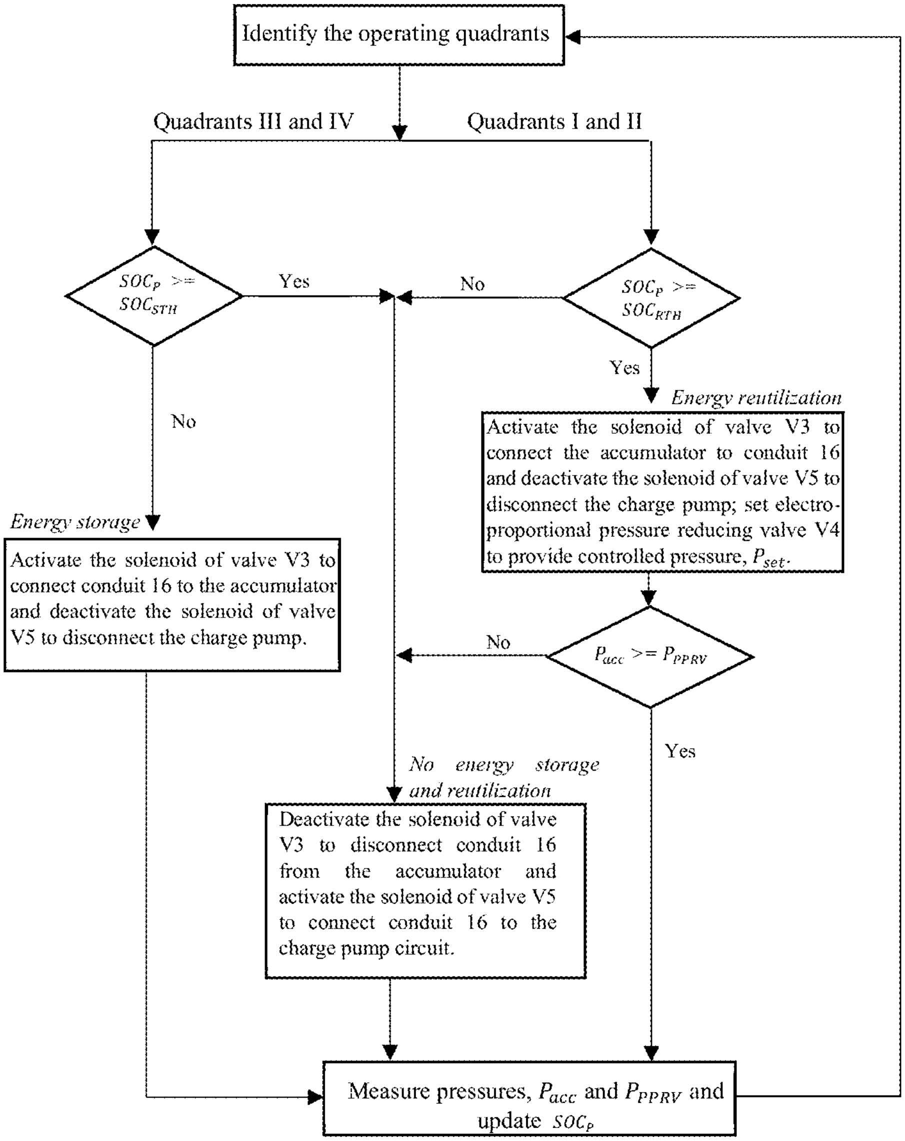
FIG. 9 is a flowchart of a control algorithm for controlling operation o fht low-pressure charging circuit.

One exemplary embodiment of a control algorithm executable by an electronic controller to implement the above-described operation of the novel charging circuit is illustrated in the flowchart of FIG. 9. The controller (not shown) is connected to the pressure transducers 12 and the displacement sensor 12A of the main circuit, and also to the pressure transducers 19 and 19A and valves V3, V4, V5 of the charge circuit. The transducers and the valves are depicted in FIG. 5. The algorithm begins with the determination of the current operating quadrant, based on a combination of the controller-calculated load pressure, $P_L$, as derived from the cap- and rod-side pressure measurements from the pressure transducers 12 of the main circuit, and the controller-calculated cylinder rod velocity, $\dot{x}_p$. as derived from the displacement measurement from the displacement sensor 12A. Once the operating quadrant is identified, the current state of energy storage within the accumulator is analyzed. Such analysis includes determination of the accumulator's state of charge, $SOC_P$ calculated as $$SOC_P = \frac{P_{acc} - P_{min}}{P_{max} - P_{min}},$$

where $P_{max}$ and $P_{min}$ are constants denoting the maximum allowable pressure of the accumulator and the accumulator's pre charged gas pressure, and $P_{acc}$ is the current accumulator pressure measured by pressure transducer 19.

In each detected instance of Quadrant III or Quadrant IV operation, this analysis of the accumulator's current state of energy storage is preceded by the controller's deactivation of the charge pump 6, if previously running, and involves comparison the state of charge $SOC_P$ with a predefined storage limit, $SOC_{STH}$ that denotes a fully charged state of the accumulator. Still referring to such detected instances of Quadrant III and Quadrant IV operation, when the state of charge analysis finds that $SOC_P$ does not exceed $SOC_{STH}$, denoting that the accumulator is not fully charged, then the controller activates the solenoid of valve V3 and deactivates the solenoid of valve V5, respectively opening and closing these valves, and thereby charging the accumulator 15 with the return fluid from the main circuit, as shown in FIGS. 7A and 7B. On the other hand, when $SOC_P$ does exceed $SOC_{STH}$ in Quadrant III or IV, denoting that the accumulator is fully charged, then the controller instead deactivates the solenoid V3 and activates the solenoid of valve V5, respectively closing and opening these valves, and thereby directing the return flow from the main circuit to the reservoir tank 5 via relief valve 11 instead of to the accumulator 15. At no point in Quadrant III or Quadrant IV is the charge pump 6 activated.

In each detected instance of Quadrant I or Quadrant II operation, the analysis of the accumulator's current state of energy storage instead involves comparison the state of charge $SOC_P$ with a predefined reutilization limit, $SOC_{RTH}$ that denotes a threshold to which the accumulator 15 must be charged before its stored energy is put to functional use. Still referring to such detected instances of Quadrant I and Quadrant II operation, when the state of charge analysis finds that $SOC_P$ does not exceed $SOC_{RTH}$, denoting that the accumulator is not sufficiently charged, then the controller deactivates the solenoid of valve V3 and activates the solenoid of valve V5, thereby closing valve V3 to disconnect the accumulator 15 from the main circuit, while opening valve V5 to connect the charge pump 6 to the main circuit. In both Quadrant I and Quadrant II, this disconnection of the accumulator 15 and connection of the charge pump 6 is accompanied by activation of the charge pump 6, resulting in respective the operational states shown in FIGS. 6A and 6B, where compensatory flow to the main circuit is derived from the charge pump 6, not the accumulator 15. On the other hand, when it is determined that $SOC_P$ does exceed $SOC_{RTH}$, the controller instead deactivates the charge pump 6, activates the solenoid of valve V3 and deactivates the solenoid of valve V5, thereby respectively opening and closing these valves to connect the accumulator 15 to the main circuit and disconnect the charge pump 6 therefrom, and the controller operates valve V4 to provide a controlled consistent pressure $P_{set}$ from the accumulator 15 into the main circuit, in accordance with what is shown in FIGS. 8A and 8B. The accumulator pressure $P_{acc}$ is also compared with the output pressure, $P_{PPRV}$, at the electro-proportional pressure-reducing valve (EPPRV) V4, to ensure that the accumulator pressure remains at least as high as the pressure, $P_{PPRV}$, in which case the compensatory flow to the main circuit is derived from the accumulator 15. If the accumulator pressure falls below the EPPRV output pressure $P_{PPRV}$, the complementary flow to the main circuit is derived from the charge pump 6 by deactivating the solenoid of valve V3 and activating the solenoid of valve V5.

It will be appreciated that the flowchart of FIG. 9 contains only novel control aspects associated with the operation of the novel charging circuit, on top of which the controller also controls operation of the main circuit's direction V1 in a manner known in the prior art, and therefore not detailed herein.

Since various modifications can be made in the invention as herein above described, and many apparently widely different embodiments of same made, it is intended that all matter contained in the accompanying specification shall be interpreted as illustrative only and not in a limiting sense.

REFERENCES

[1] L. Wang and W. J. Book, "Using Leakage to Stabilize a Hydraulic Circuit for Pump Controlled Actuators," *Journal of Dynamic Systems, Measurement, and Control*, vol. 135, pp. 061007-1-12, 2013.

[2] G. Ren, G. K. Costa and N. Sepheri, "Position control of an electro-hydrostatic asymmetric actuator operating in all quadrants," *Mechatronics*, vol. 67, p. 102344, 2020.

[3] N. Niksefat, N. Sepheri and Q. Wu, "Design and experimental evaluation of a QFT contact taskcontroller for electro-hydraulic actuators," *International Journal of Robust and Nonlinear Control*, vol. 17, pp. 225-250, 2007.

[4] IEA, "CO2 emissions by energy source," IEA, 2020. [Online]. Available: https://www.iea.org/articles/global-energy-review-co2-emissions-in-2020. [Accessed 9 Oct. 2021].

[5] L. Ge, L. Quan, X. Zhang, Z. Dong and J. Yang, "Power Matching and Energy Efficiency Improvement of Hydraulic Excavator Driven with Speed and Displacement Variable Power Source," *Chinese Journal of Mechanical Engineering*, vol. 32, no. 100, pp. 1-12, 2019.

[6] G. K. Costa and N. Sepehri, Hydrostatic Transmissions and Actuators Operation, Modelling and Applications, Hoboken, NJ, USA: Wiley, 2015.

[7] M. Pachter, C. H. Houpis and K. Kang, "Modelling and Control of an Electro-hydrostatic Actuator," *International Journal of Robust and Non-Linear Control*, vol. 7, p. 591-608, 1997.

[8] J. Choi, "Robust position control of electro-hydrostatic actuator systems with radial basis function neural networks," *Journal of Advanced Mechanical Design, Systems, and Manufacturing*, vol. 7, no. 2, pp. 257-267, 2013.

[9] G. K. Costa and N. Sepehri, "Four-Quadrant Analysis and Four-Quadrant Analysis and Hydrostatic Actuators," *Journal of Dynamic Systems, Measurement, and Control*, vol. 141, pp. 021011-(1-15), 2019.

[10] T. Lin, W. Huang, H. Ren, S. Fu and Q. Liu, "New compound energy regeneration system and control strategy for hybrid hydraulic excavators," *Automation in Construction*, vol. 68, pp. 11-20, 2016.

[11] J. I. Yoon, D. Q. Truong and K. K. Ahn, "A Generation Step for An Electric Excavator with a Control Strategy and Verifications of Energy Consumption," *International Journal of Precision Engineering and Manufacturing*, vol. 14, no. 5, pp. 755-766, 2013.

[12] B. Hu, X. He, G. Xiao, L. Tan and Y. Jiang, "Research on the efficiency of Arm's potential energy regeneration system for a hydraulic mini excavator," in *International Conference on Advances in Construction Machinery and Vehicle Engineering* (*ICACMVE*), Changsha, 2019.

[13] R. Hippalgaonkar and M. Ivantysynova, "Optimal Power Management of Hydraulic Hybrid Mobile Machines—Part I: Theoretical Studies, Modeling and Simulation," *Journal of Dynamic Systems, Measurement, and Control,* 2016.

[14] M. Chen and D. Zhao, "The gravitational potential energy regeneration system with closed-circuit of boom of hydraulic excavator," Mechanical Systems and *Signal Processing*, vol. 82, pp. 178-192, 2016.

[15] L. Ge, L. Quan, Y. Li, X. Zhang and J. Yang, "A novel hydraulic excavator boom driving system with high efficiency and potential energy regeneration capability," *Energy Conversion and Management*, vol. 165, pp. 308-217, 2018.

The invention claimed is:

1. An electro-hydrostatic actuator (EHA) comprising:

a main hydraulic circuit having installed therein:

a bidirectional pump-motor rotationally coupled to an electric motor that is operable to drive a pumping operation of said bidirectional pump-motor;

a hydraulic cylinder; and main circuit valving and connections between the first bidirectional pump-motor and the hydraulic cylinder by which the EHA is operable in four distinct operating quadrants, including a first actuator-extending pumping quadrant, a second actuator-extending motoring quadrant, a third actuator-retracting pumping quadrant and a fourth actuator-retracting motoring quadrant; and in connection with the main circuit, a low-pressure charging circuit having installed therein:

an accumulator;

a reservoir tank;

a charge pump; and charge circuit valving co-operable with the accumulator and the charge pump to (i) during the third and fourth quadrants, charge the accumulator using return flow from the main hydraulic circuit; (ii)

during the first and second quadrants, in instances thereof characterized by a charged state of the accumulator, deliver compensatory flow to the main hydraulic circuit from the accumulator; and (iii) during the first and second quadrants, in instances thereof characterized by an inadequately charged state of the accumulator, deliver compensatory flow to the main hydraulic circuit from the charge pump;

wherein said charge circuit valving comprises an electro-proportional pressure-reducing valve configured to act on the compensatory flow from the accumulator.

2. The actuator of claim 1 wherein said charge circuit valving comprises a pump control valve operable between open and closed states to selectively allow and prevent flow from the charging pump into the main hydraulic circuit, said pump control valve being configured to switch from the closed state to the open state in said instances of the first and second quadrants characterized by the inadequately charged state of the accumulator.

3. The actuator of claim 2 wherein said charge circuit valving comprises an accumulator control valve operable between open and closed states to selectively allow and prevent flow between the accumulator and the main hydraulic circuit, said accumulator control valve being configured to occupy the closed state in said instances of the first and second quadrants characterized by the inadequately charged state of the accumulator, and occupy the open state during the third and fourth quadrants and the other instances of the first and second quadrants characterized by the charged state of the accumulator.

4. The actuator of claim 1 wherein said charge circuit valving comprises an accumulator control valve operable between open and closed states to selectively allow and prevent flow between the accumulator and the main hydraulic circuit, said accumulator control valve being configured to occupy the closed state in said instances of the first and second quadrants characterized by the inadequately charged state of the accumulator, and occupy the open state during the third and fourth quadrants and the other instances of the first and second quadrants characterized by the charged state of the accumulator.

5. The actuator of claim 1 wherein the electro-proportional pressure-reducing valve is also configured to act on the compensatory flow from the charge pump.

6. The actuator of claim 5 wherein said charge circuit valving further comprises a unidirectional flow control valve installed between the electro-proportional pressure reducing valve and the main circuit.

7. The actuator of claim 1 wherein said charge circuit valving further comprises a unidirectional flow control valve installed between the electro-proportional pressure reducing valve and the main circuit.

8. A method of operating an electro-hydrostatic actuator having a main circuit, a charging circuit and four different operating quadrants, said method comprising using return flow from the main circuit to the charging circuit to charge an accumulator of said charging circuit during an actuator-retracting pumping quadrant and an actuator-retracting motoring quadrant of the actuator's four different operating quadrants, and using a charged state of said accumulator to deliver compensatory flows to the main circuit, through an electro-proportional pressure-reducing valve, during at least some instances of an actuator-extending pumping quadrant and an actuator-extending motoring quadrant of the four different operating quadrants.

9. The method of claim 8 comprising, in other instances of the actuator-extending pumping quadrant and the actuator-extending motoring quadrant, using a charge pump of the charging circuit to instead deliver compensatory flows to the main circuit from a charging pump of the charging circuit.

10. The method of claim 9 wherein delivery of said compensatory flows to the main circuit from the charging pump is also performed through said electro-proportional pressure-reducing valve.

11. The method of claim 10 wherein delivery of said compensatory flows to the main circuit from the charge pump is made through a unidirectional flow control valve installed between the electro-proportional pressure reducing valve and the main circuit.

12. The method of claim 11 wherein delivery of said compensatory flows to the main circuit from the accumulator is also made through said unidirectional flow control valve.

13. The method of claim 8 wherein delivery of said compensatory flows to the main circuit from the accumulator is made through a unidirectional flow control valve installed between the electro-proportional pressure reducing valve and the main circuit.

* * * * *